Dec. 11, 1956    L. V. LARSEN    2,773,755
VAPOR STORAGE VESSEL
Filed June 2, 1953    2 Sheets-Sheet 1
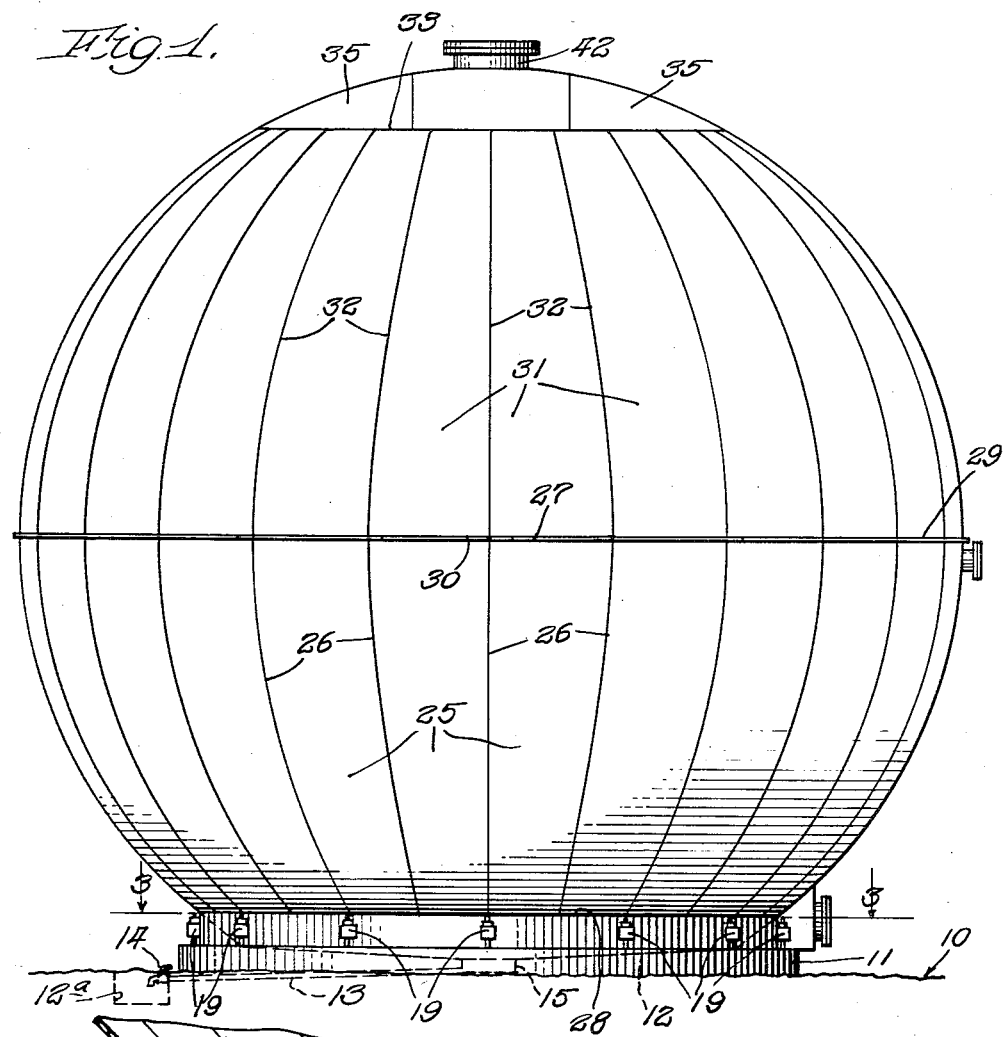
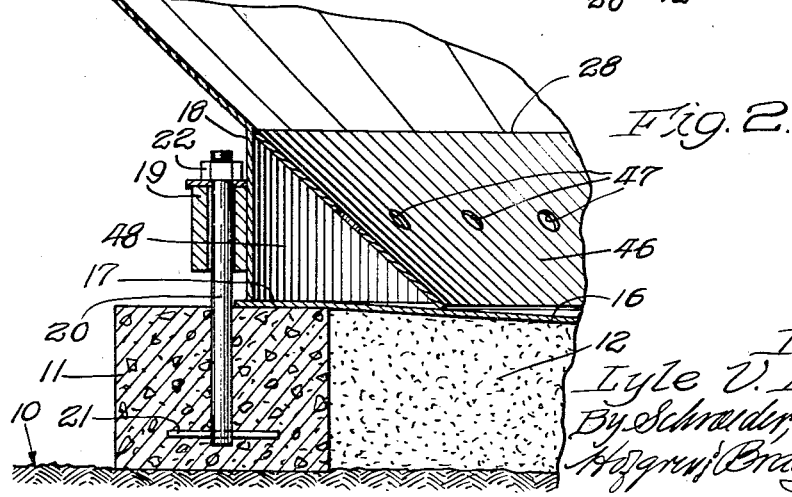
Inventor:
Lyle V. Larsen,
By Schroeder, Merriam,
Hofgren & Brady, Attys.

Dec. 11, 1956   L. V. LARSEN   2,773,755
VAPOR STORAGE VESSEL
Filed June 2, 1953   2 Sheets-Sheet 2

Inventor:
Lyle V. Larsen,
By Schroeder, Merriam,
Hofgren & Brady, Attys.

United States Patent Office 2,773,755
Patented Dec. 11, 1956

2,773,755

VAPOR STORAGE VESSEL

Lyle V. Larsen, Chicago, Ill., assignor to Chicago Bridge & Iron Company, a corporation of Illinois Application June 2, 1953, Serial No. 359,147

1 Claim. (Cl. 48—174)

This invention relates to a vapor or gas storage vessel and more particularly to a vessel intended to store the volatile vapors of gasoline and other petroleum products.

A number of volatile petroleum products are stored in large cone roof tanks of many thousands of barrels capacity. The cone roofs of these tanks are gas tight, but are not strong enough to withstand much pressure. Consequently, the contents of the tank suffer what is called a "breathing loss."

When the tank and its contents are heated by the sun, the air-vapor mixture above the product in the tank expands. Since the vapor space in the tank, for all practical purposes, remains constant, some of the air-vapor mixture must be released from the tank to prevent it from rupturing. Normally, the excess air-vapor mixture is vented to the atmosphere at a pressure of about ¾″ of water, or ½ ounce p. s. i.

As the day wears on and the tank cools, the air-vapor mixture contracts. Air must then enter the vapor space of the tank to replace that air-vapor mixture emitted during the expansion cycle. Otherwise the tank would collapse under the partial vacuum that would exist. The nature of the volatile product is such that it tends to saturate the air drawn into the tank, which in turn depletes the stored product with each breath. Since this cycle repeats itself practically every day, the losses become quite large and worthy of preventive measures.

A practical method of preventing this breathing loss utilizes a vapor storage vessel which is connected to the vapor space of cone roof tanks with large diameter piping. The vapor storage vessel temporarily stores the vapor expelled from the cone roof tank during the expansion period and returns it to the cone roof tank during the inhalation period. Since no fresh air is drawn into the system to be saturated, the product stored is not depleted from the breathing action.

These vapor storage vessels have taken various forms; however, they all operate at relatively low pressures and vacuums, well within that which can be tolerated by the cone roof tanks. The vapor passes from the cone roof tank to the vapor storage vessel through the vapor lines, and back as necessary by natural pressure and vacuum forces. One such storage vessel which has met with substantial commercial success is spherical in shape and is supported on a number of columns. It incorporates a flexible hemispherical diaphragm attached to the horizontal equator of the sphere on the inside. The air-vapor mixture is introduced between the flexible diaphragm and the bottom half of the sphere, and the diaphragm can float from the lower position against the lower hemisphere of the tank to the upper position against the upper hemisphere of the tank according to the needs of the tank, or tanks, to which it is connected. The number and size of tanks to be connected to the vapor storage vessel are taken into consideration when choosing its size.

One disadvantage of this column-supported spherical shell vapor storage vessel is the cost, both in the amount of steel required for its manufacture, and in the cost of the foundation. The shell plates of such a vessel are as thin as can reasonably be made so as to be self-supporting, and also to sustain a welding procedure to secure the plates together. Thus, it is obvious that the price of the vessel is dependent largely upon its design and the amount of steel required for a given volume of vapor storage.

The present invention provides a structure which will store vapors with the same efficiency as heretofore known in vapor storage vessels. It has the advantage of being lower in price, primarily because of the savings in the amount of steel required in its manufacture and fabrication, along with a savings in the foundation requirement.

In general, the vapor storage vessel proposed herewith is of substantially spherical construction, but is different from those known in the past in that it sets directly upon a foundation, which in turn rests directly upon the ground. This vapor storage vessel is not completely spherical, in that the bottom portion is cut off on a horizontal radius equal to the radius of the foundation ring, so that the lower portion of the shell and the foundation ring are substantially the same size. No additional supporting structure is required, and the structure may be designed for any reasonable wind pressure. Other advantages of the vessel will become apparent in the following description taken in connection with the figures of the accompanying drawing.

Figure 1 is a side vertical elevational view of a vapor storage vessel constructed in accordance with the invention herein;

Figure 2 is a fragmentary vertical sectional view through a portion of the supporting foundation ring and associated vessel portions;

Figure 3:
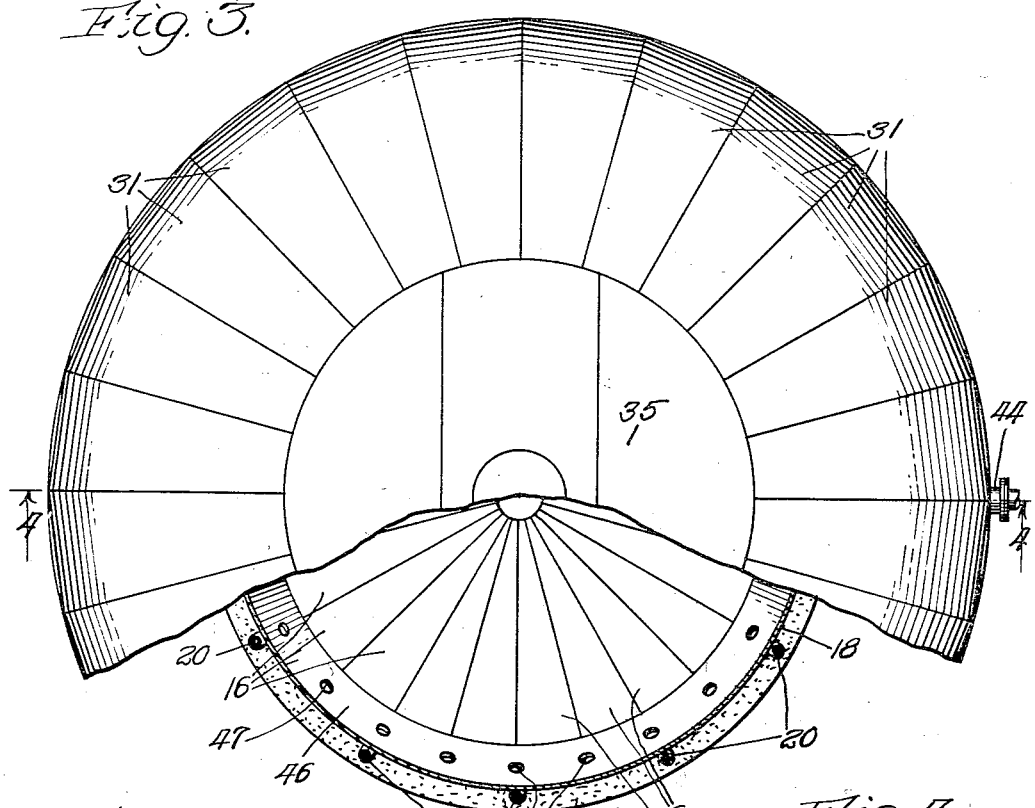
Figure 4:
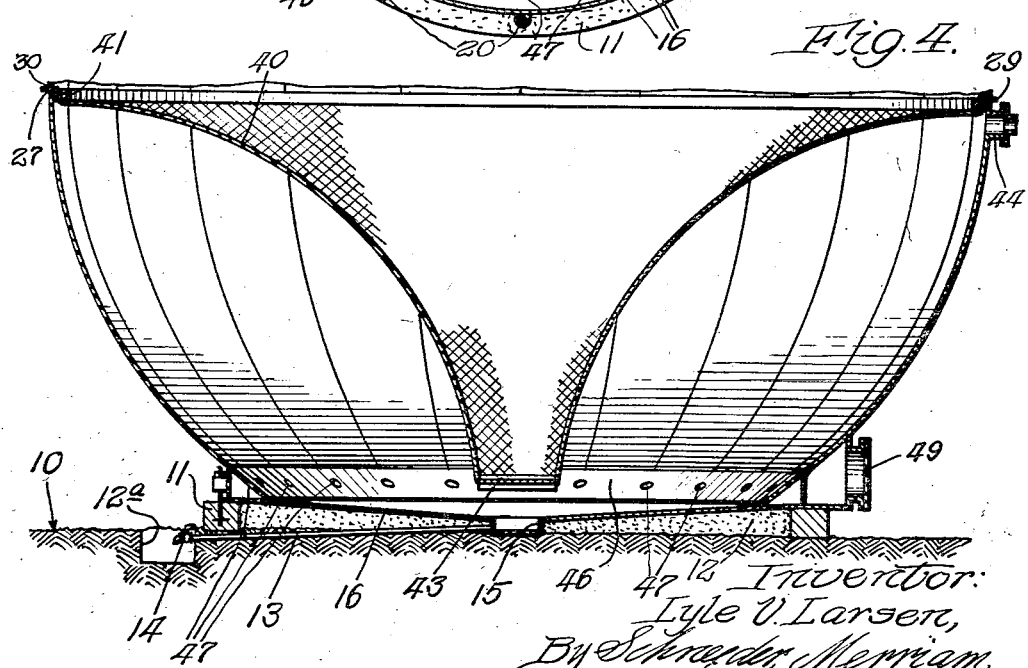

Figure 3 is a broken horizontal view, partly in section, along line 3—3 of Figure 1, to show the outline of the vessel structure as well as a horizontal plan view of the foundation and bottom; and Figure 4 is a fragmentary vertical sectional view taken through the center line of the vessel and substantially along the line 4—4 of Fig. 3, particularly showing the foundation detail and the attachment of the diaphragm to the vessel shell.

One of the advantages in the present construction is in the formation of the foundation. In the past, foundations of concrete ordinarily were formed in excavations and whether they consisted of piers or primarily foundation blocks upon which foundations could be supported, they required a considerable amount of preparation at the site for the tank. In the present invention, it is merely required that the ground be levelled above the foundation is constructed above the ground level. In Figures 1 and 2 it will be noticed that the ground level 10 has been fairly uniformly levelled without forming any excavations in the ground. A concrete foundation ring 11 is formed above ground by suitable forms, which are not shown since the vessel as illustrated is in its complete form ready for service. This ring is of sufficient size to support the vessel without cracking and also of sufficient weight as to resist the overturning moment of the wind pressure against the side of the ank. The area inside the concrete ring 11 is filled with a cinder or gravel fill material 12 which is ordinarily graded up to the level of the ring at the outer periphery and is at a lower level inside or toward the center part of the foundation. Before pouring the foundation ring, provision is made for a sump collection pit 12a outside of the ring and a suitable condensate drain 13, with a suitable stopcock 14 on the outer end, is connected into a central sump 15 which will be connected with the interior of the vessel. The sump pit 12a is generally a rather small rectangular hole into which condensate may be drained at the will of the operator of the vessel.

The formation of the bottom of the vessel may best be seen from Figures 3 and 4. In these figures it will be noticed that the bottom is formed of plates 16 welded together in a lap weld and ordinarily they are no thicker than 3/16". The plates extend over the fill material 12 and over a portion of the concrete ring 11. A sufficient number of the plates 16 have been welded together into a complete circular ring forming a vapor-tight bottom cover. This bottom cover, formed of the plates 16, has a slight downward slope forming a shallow coned bottom so than any condensate in the vapor storage vessel will drain into the sump 15 and by opening cock 14 of the drainpipe 13 such condensate may drain into the sump 12a outside the vessel. From Figure 2, it will be noted that the plates 16 lie flat in their outer portion 17 so as to extend contiguously over the inner portion of the concrete ring 11. One particular advantage of this bottom structure is that should the owner and operator of the vessel neglect to drain condensate from the sump 15 so that a portion of the condensate extends over the conical bottom 16, no damage to the structure can result since the bottom is resting directly against the fill material 12 which is in turn against the ground 10.

Direcly upon the bottom plate 16 and particularly the outer portion 17 is erected a substantially vertical skirt portion 18 which is sometimes referred to as a rim plate. This plate is substantially circular as shown in Figure 3. It may vary from a true circle in an amount to be secured to the shell plates which will be hereinafter described. This rim plate is welded directly to the outer portion 17 of the bottom plates 16. At various spaced portions along this rim a number of collars 19 are secured as by welding for the reception of anchor bolts 20 which are imbedded in the concrete foundation ring 11. In order to anchor these bolts, a cross tie member 21 may be provided on the lower end of the bolts and a nut 22 may be used for tightening the rim 18 and plates 16 against the foundation ring 11. Enough anchor bolts are provided to insure that the weight of the concrete ring may help resist the overturning moment of the vessel which may be induced by wind pressure against one side.

The shell plates of the vessel are ordinarily constructed of plates which are not dished; that is, they are not shaped like a typical orange peel section but are flat in horizontal direction as assembled in the vessel shell. These plates, therefore, approximate the shape of a sphere when placed together but the sphere in fact is a polyhedron in any horizontal cross section. The bottom shell plates 25 are welded along mating vertical extending edges 26 and extend to the equator 27 of the vessel. These shell plates at their bottom edges 28 are welded directly to the upper edge of the upstanding skirt 18. At the equator of the vessel, a circular angle iron 29 may be interposed between the upper edge 27 of the lower plate and the lower edge 30 of the upper shell plate 31. Hence, this angle is circular in plan. One leg of the angle may be interposed between the plates and even though a horizontal cross section consists of a polyhedron this angle will provide a connection between plates of the lower shell portion and the upper shell portion of the vessel. The upper shell plates are similarly welded together between their upwardly extending edges 32 and the upper edges 33 of the plates 31 form a circular opening which will be understood as being actually a polyhedron in cross section. The top of the vessel is filled in with a number of dished plates 35 which together form a spherical section as the top closure of the vessel.

Ordinarily, the plates 25 comprising the bottom half of the vessel are formed of 3/16" thickness which are welded on the outside with a single pass and on the inside with an equal single pass. The welds on the inside are ground smooth so as to remove all burrs and projections which might interfere or tear the diaphragm which will be described. The plates 31 comprising the upper portion of the vessel need only be given a single pass on the outside since these plates form a cover against the weather and do not have to be vapor-tight as do the plates of the bottom shell portion. Ordinarily, vessels up to approximately 52 feet in diameter would be constructed of 3/16" plate and larger sizes up to 66 feet may be made of 1/4" plate. The height of the skirt or rim plate 18 may also vary in accordance with the size of the vessel so as to give a balanced appearance.

In order that the vapor storage vessel may have a variable vapor storage capacity, a hemispherical curtain or diaphragm 40 is connected to the angle iron 29 previously described. The diaphragm may be of nylon material impregnated with a gas impervious substance such as one of the synthetics and is preferably formed so as to have a hemispherical shape substantially equal in size to the upper portion of the vapor storage vessel. The particular connection does not form a part of the present invention so is not shown in detail, however, in Figure 4 it will be noted that the upper edge 41 of the diaphragm material is secured to the angle iron 29 in a manner that provides a vapor-tight connection. Thus the space in the vapor vessel below the diaphragm forms a vapor chamber. The space above the diaphragm is open to the air through a top vent 42 of the vessel. Equator positioned vents may also be provided although in the present illustration none is shown.

In order to control the shape and configuration of the diaphragm as it floats upwardly on the column of vapor stored within the vessel a weight 43 is provided in the center of the diaphragm. This weight ordinarily controls the configuration so that the diaphragm may not sweep or rub against the shell portion thus contributing to its earlier failure. A vapor vacuum and pressure vent is connected to the vapor chamber in order to insure that the pressure or vacuum created in the vessel does not exceed prescribed limits. A particular advantage of this vessel shape is that the diaphragm having the same size as the upper hemispherical portion of the vessel may be backed up by that upper portion when the vessel is full thus avoiding any rupture of the diaphragm with excessive pressure. In the same manner, the diaphragm may rest against the bottom portion of the vessel and thus avoid rupture by excessive vacuum which may upon occasion be created within the vapor chamber.

The form of admitting the gas to and withdrawing it from the vessel is shown in Figures 1 and 4. Around the base of the vessel, an inclined annular plate 46 is shown as extending between the bottom plate 16 and the upper edge of the vertical rim plate 18. This plate 46 has a plurality of openings 47 therein at close spaces about the periphery of the vessel. It may be a more perforate plate if desired. The purpose of this plate is to form a chamber 48 between the rim 18, the bottom plates 16 and plate 46 into which gases which are to be stored in the vessel are directed through connection 49. The vapor chamber 48 acts as a distributing ring permitting gases to be gradually admitted into the vapor chamber and thus avoiding a direct forceful impingement thereof against the diaphragm.

In general, the vapor storage vessel of this invention may be used with a number of connected cone-roofed storage tanks. Vapor lines from these tanks may be directed to the vapor chamber of the vessel so that during periods of expansion of the vapor the vapor will be conducted to the vessel, floating the diaphragm upwardly and increasing the capacity of the vapor chamber in accordance with the amount of vapor to be stored. During periods of condensation of the vapor within the cone-roofed tanks, the vapor will be transferred back to those tanks from the vapor storage vessel.

By constructing the vessel in accordance with the present invention, a savings in steel of about 5 tons in the large sizes may be made over a similarly spherically shaped vessel supported on columns. A substantial savings is made in the foundation since the concrete ring is of the simplest design and needs only a form constructed above ground level for its fabrication. The fill material 12 need never be replaced as it is retained in position by the concrete ring. As mentioned before this fill material provides an adequate foundation for the bottom plates 16 and one need never fear that the plates might be ruptured, thus breaking the vapor-tight character of the bottom portion of the vessel since these plates rest directly on the fill and the weight of condensate which may collect cannot affect the vapor-tight condition of the bottom plate.

In some regions, concrete may be difficult to obtain at times, so that buried anchors or "dead men" may be used to tie the vessel down. In some instances, ties in the form of cables may be extended down to such anchors from the equator of the vessel and the bottom placed directly upon a sand fill base. These and other features of the present invention may be used to support the vessel where conditions dictate a variance from the preferred structure.

In order that access to the vapor chamber may be most easily made, a relatively large manhole may be provided near the foundation ring 11. Through this manhole, service of the diaphragm may be made or any other repairs that may become necessary.

The foregoing detailed description is given for clearness of understanding only, and no unnecessary limitations should be understood therefrom, for some modifications will be obvious to those skilled in the art.

I claim:

A thin wall rigid self-sustaining vapor storage vessel comprising: a self-supporting spherical-like shell of relatively light weight material incomplete at its bottom to form an open circular base portion; a vertical annular skirt attached to said base portion; a shallow conical vapor tight bottom secured to the bottom of said skirt and forming a vapor tight vessel with said skirt and shell; a flexible floating diaphragm within and secured to said shell and dividing the vessel into two compartments; an annular inclined perforated plate diagonally positioned between the lower end of said shell and the bottom, forming a vapor distributing chamber around the bottom of the vessel between said perforate plate and said vertical skirt; inlet and outlet means communicating with said distributing chamber; a foundation ring resting on ground surface and supporting said shell by indirectly engaging said skirt; fill material within said ring and between said ground surface and said conical bottom and forming a support for the latter, said foundation ring having sufficient weight to resist overturning movement of wind pressure; and means for securing said skirt to said foundation ring, whereby said vessel may be supported directly upon a foundation ring resting directly upon ground surface unprepared except as to leveling.

References Cited in the file of this patent

UNITED STATES PATENTS

| | | |
|---|---|---|
| 1,670,024 | Day | May 15, 1928 |
| 2,045,478 | Kuhen | June 23, 1936 |
| 2,050,684 | Wiggins | Aug. 11, 1936 |
| 2,050,686 | Wiggins | Aug. 11, 1936 |
| 2,114,513 | Wilkin | Apr. 19, 1938 |
| 2,257,941 | Ellis | Oct. 7, 1941 |
| 2,672,254 | Boardman | Mar. 16, 1954 |

FOREIGN PATENTS

| | | |
|---|---|---|
| 610,479 | Great Britain | Oct. 15, 1948 |